United States Patent
Yoon

(10) Patent No.: US 6,520,525 B1
(45) Date of Patent: Feb. 18, 2003

(54) FOLDING TRICYCLE

(76) Inventor: Suk Kwon Yoon, 488-8 Wonseong-dong, Cheonan-shi Chungcheongnam-do (KR), 330-070

( * ) Notice: Subject to any disclaimer, the term of this patent is extended or adjusted under 35 U.S.C. 154(b) by 0 days.

(21) Appl. No.: 09/600,676

(22) PCT Filed: Jul. 20, 1999

(86) PCT No.: PCT/KR99/00382

§ 371 (c)(1),
(2), (4) Date: Jul. 20, 2000

(87) PCT Pub. No.: WO00/05127

PCT Pub. Date: Feb. 3, 2000

(30) Foreign Application Priority Data

Jul. 21, 1998  (KR) ............................... 98-29242

(51) Int. Cl.$^7$ ................................. B62K 5/04
(52) U.S. Cl. ....................... 280/278; 280/251; 280/252; 280/270; 280/221; 280/287; 74/137
(58) Field of Search ................................ 280/639, 641, 280/655.1, 251, 252, 253, 255, 263, 264, 270, 282, 220, 221, 200, 210, 771, 92, 93.502, 93.51, 651, 655, 88, 278, 87.05, 281.1, 287; 74/126, 136, 137, 138

(56) References Cited

U.S. PATENT DOCUMENTS

| | | | | |
|---|---|---|---|---|
| 97,421 A | * | 11/1869 | Maynard | 280/255 X |
| 450,001 A | * | 4/1891 | Carter | 280/255 X |
| 1,258,391 A | * | 3/1918 | Bried | 280/251 |
| 1,404,274 A | * | 1/1922 | Cooper | 280/270 X |
| 1,604,548 A | * | 10/1926 | Davis et al. | 280/270 X |
| 1,653,889 A | * | 12/1927 | Clark | 280/221 |
| 3,905,618 A | * | 9/1975 | Miranda | 280/278 |
| 4,111,447 A | * | 9/1978 | Ishida | 280/278 |
| 4,202,561 A | * | 5/1980 | Yonkers | 280/278 |
| 4,408,776 A | * | 10/1983 | Randolph et al. | 280/282 X |
| 4,574,649 A | * | 3/1986 | Seol | 74/138 |
| 4,824,131 A | * | 4/1989 | Thay | 280/278 |
| 4,828,284 A | * | 5/1989 | Sandgren | 280/221 |
| 5,040,809 A | * | 8/1991 | Yang | 280/651 X |
| 5,145,196 A | * | 9/1992 | Langkamp | 280/278 |
| 5,294,140 A | * | 3/1994 | Rinkewich | 280/221 |
| 5,368,321 A | * | 11/1994 | Berman et al. | 280/221 |
| 5,486,015 A | * | 1/1996 | Lau | 280/278 X |
| 5,915,723 A | * | 6/1999 | Austin | 280/651 |
| 6,173,981 B1 | * | 1/2001 | Coleman | 280/221 X |

FOREIGN PATENT DOCUMENTS

| | | | | |
|---|---|---|---|---|
| DE | 4413712 A1 | * | 10/1995 | |
| EP | 0466624 A1 | * | 1/1992 | |
| WO | WO 90/03301 A1 | * | 4/1990 | 280/278 |

* cited by examiner

Primary Examiner—F. Zeender
(74) Attorney, Agent, or Firm—Auslander & Thomas

(57) ABSTRACT

A folding tricycle, maximizing the exercise effect by allowing a user to pedal the tricycle while standing up on the pedals, as well as being easy to move and carry by being folded to be of a small size, is disclosed. The folding tricycle has a running unit consisting of a main frame, two front wheels, and a rear wheel. The main frame consists of two frame parts with a first folding part joining the two frame parts together, thus being foldable at the folding part. The two frame parts respectively have a front wheel shaft housing and a rear wheel support assembly. The tricycle also has steering unit used for steering the rear wheel. The steering unit has a second folding part, thus being foldable at the second folding part. The tricycle also has a brake unit used for selectively braking the front wheels. In addition, the tricycle has drive unit used for generating a rotating force and transmitting the rotating force to the front wheels through two front wheel shafts alternately acting as driving and driven shafts. The drive unit is designed to generate the rotating force from the pedals operated by a user standing up with both feet being placed on the two pedals.

4 Claims, 7 Drawing Sheets

FOLDING TRICYCLE

TECHNICAL FIELD

The present invention relates, in general, to folding tricycles and, more particularly, to a folding tricycle designed to allow a user to pedal the tricycle while standing up on the pedals so as to transmit the pedaling force to two front wheels, thus increasing the exercising effect during a pedaling action, the tricycle being also designed to be easily foldable, thereby being of a small size and allowing the user to easily move and carry the folded tricycle.

BACKGROUND ART

In recent years, the use of bicycles has been diversified into the use for leisure sport in addition to their original use for transportation.

In accordance with the recent trend of rapid generalization of automobiles and motorcycles in place of bicycles in addition to complex traffic conditions, the use of bicycles as transportation means has declined. However, people want to use bicycles as an exercising means, that is, exercising while pedaling the bicycles. In order to meet such a requirement, several types of exercising instruments having the structures of bicycles have been proposed and widely used. These types of exercising instruments are problematic in that they do not provide a user with a full feeling of riding bicycles outdoors and it is very difficult to move and carry the exercising instruments to a desired place.

To overcome the problems, a variety of folding bicycles have been proposed. Such folding bicycles are designed to be easily foldable and to be easily carried to a desired outdoor place, thereby being effectively used for leisure sport.

Such conventional folding bicycles are designed to allow a user to rotate the pedals while seated on a saddle. However, the folding bicycles fail to maximize the exercising effect since they force a user to sit on a saddle while riding a bicycle. Another problem, experienced in the conventional folding bicycles, resides in that the bicycles have a large volume when they are completely folded so as to be moved and carried to a desired place. This is inconvenient to a user while moving and carrying the folded bicycles.

DISCLOSURE OF THE INVENTION

Accordingly, the present invention has been made keeping in mind the above problems occurring in the prior art, and an object of the present invention is to provide a folding tricycle, maximizing the exercise effect by allowing a user to pedal the tricycle while a user is standing up on the pedals, as well as being easy to move and carry by being folded to be of a small size.

In order to accomplish the above object, the present invention provides a folding tricycle, comprising: a running unit consisting of a main frame, two front wheels mounted to both sides of a front end portion of the frame, the main frame consisting of two frame parts with a first folding part joining the two frame parts together, thus being foldable at the folding part, the two frame parts respectively having a front wheel shaft housing and a rear wheel support assembly; a steering unit used for steering the rear wheel, the steering unit having a second folding part, thus being foldable at the second folding part; a brake unit used for selectively braking the front wheels; and a drive unit used for generating a rotating force and transmitting the rotating force to the front wheels through two front wheel shafts alternately acting as driving and driven shafts, the drive unit being designed to generate the rotating force from the pedals operated by a user standing up with both feet being placed on the two pedals.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

First of all, a construction of the best mode of this invention is described hereinafter in conjunction with the accompanying drawings.

A folding tricycle of this invention is generally divided into four units; a running unit, a steering unit, a brake unit, and a drive unit, in the same manner as that of conventional vehicles.

The running unit of this invention is constructed as follows.

Figure 1:
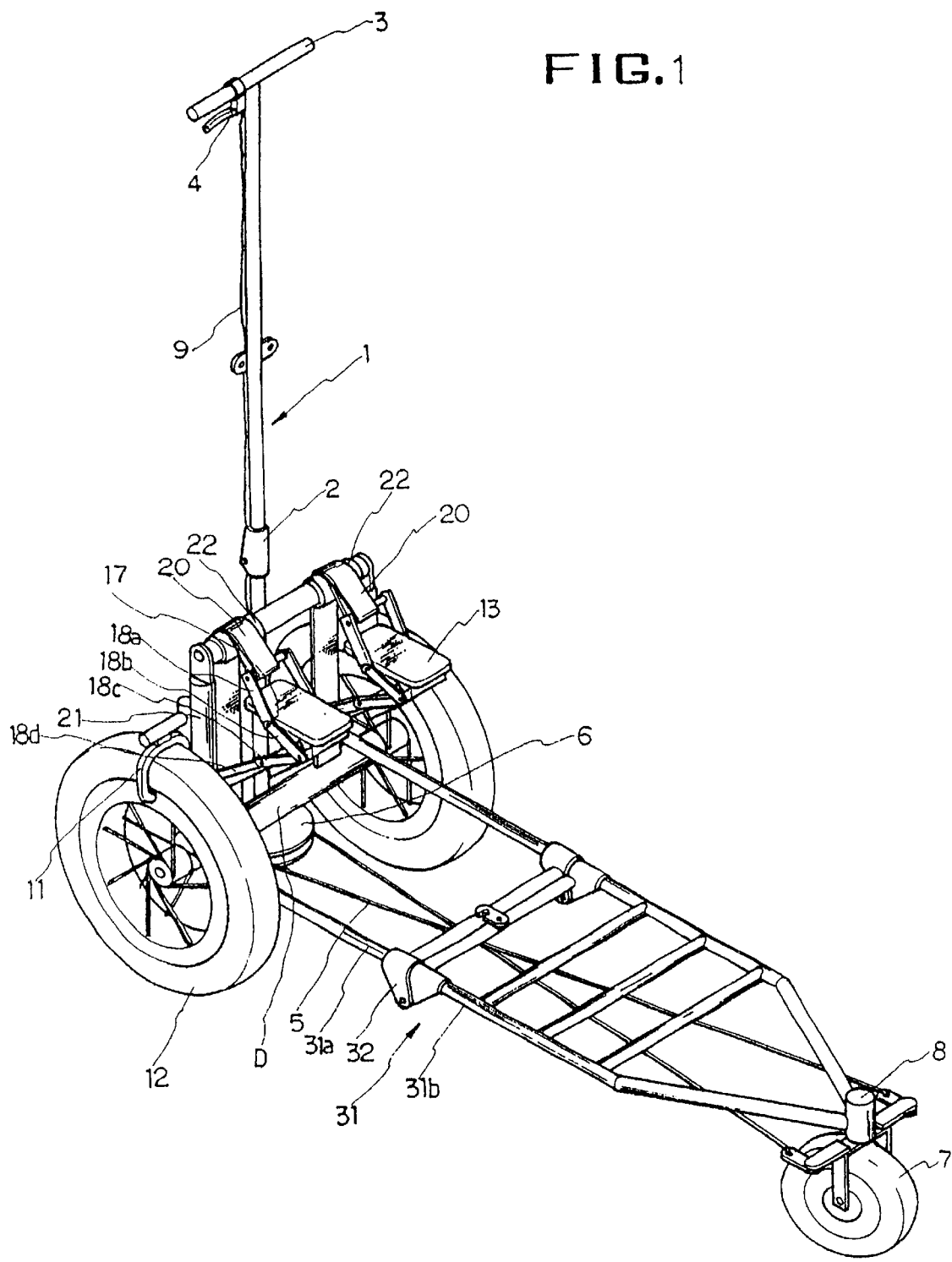
FIG. 1 is a perspective view, showing a complete structure of a tricycle according to the preferred embodiment of this invention.
Figure 2A:
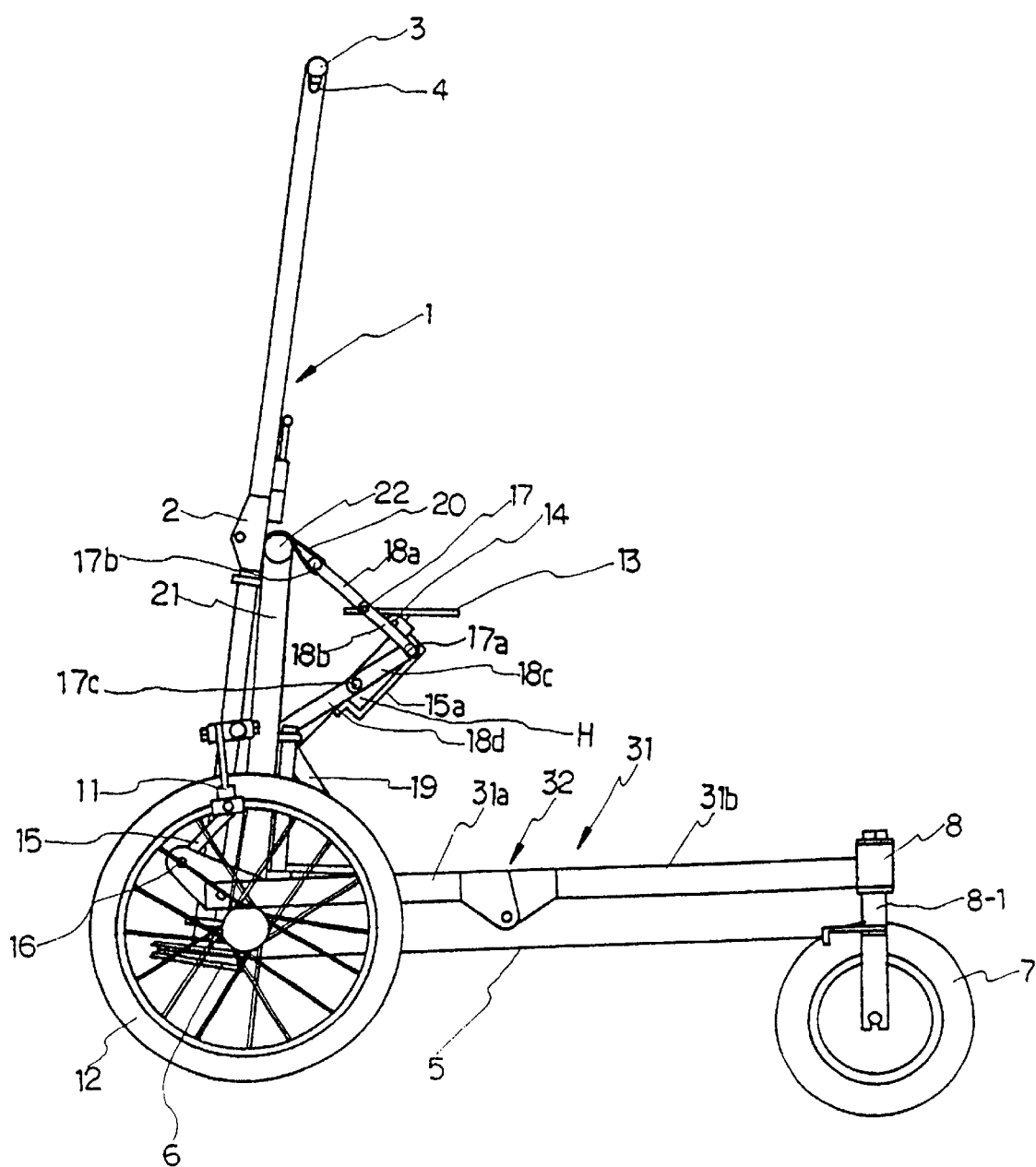
FIGS. 2A and 2B are side elevation views of the above tricycle.
Figure 2B:
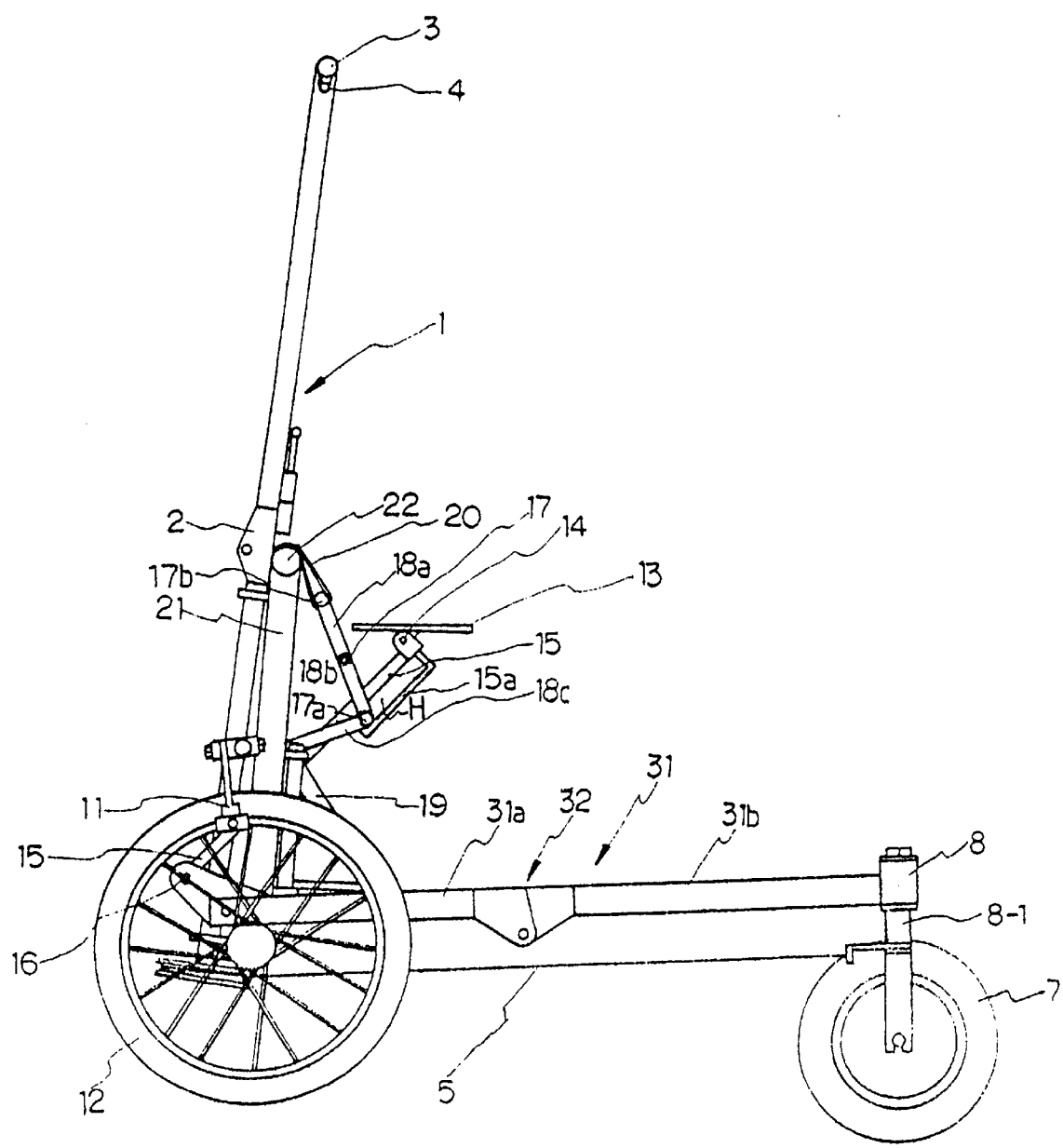
Figure 3:
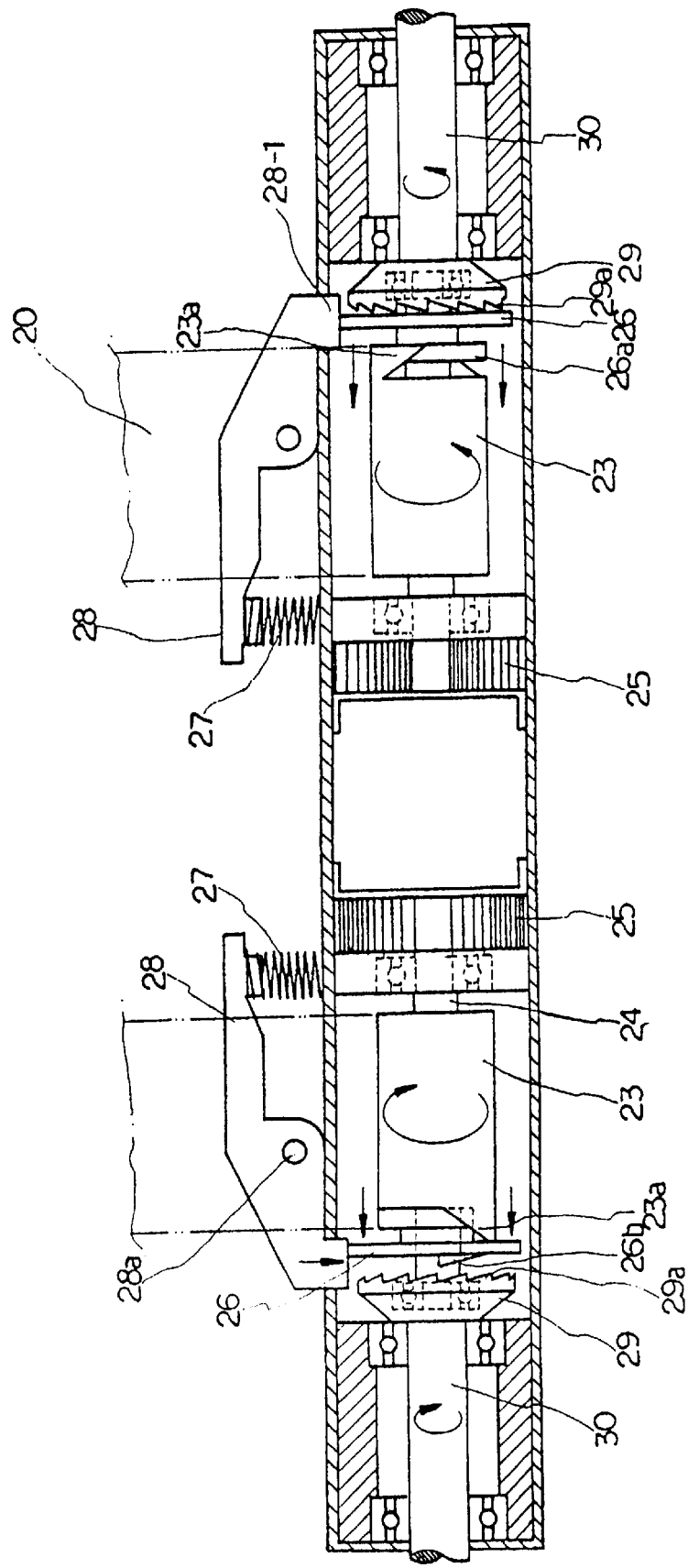
FIG. 3 is a view, showing a drive unit of the above tricycle.
Figure 4:
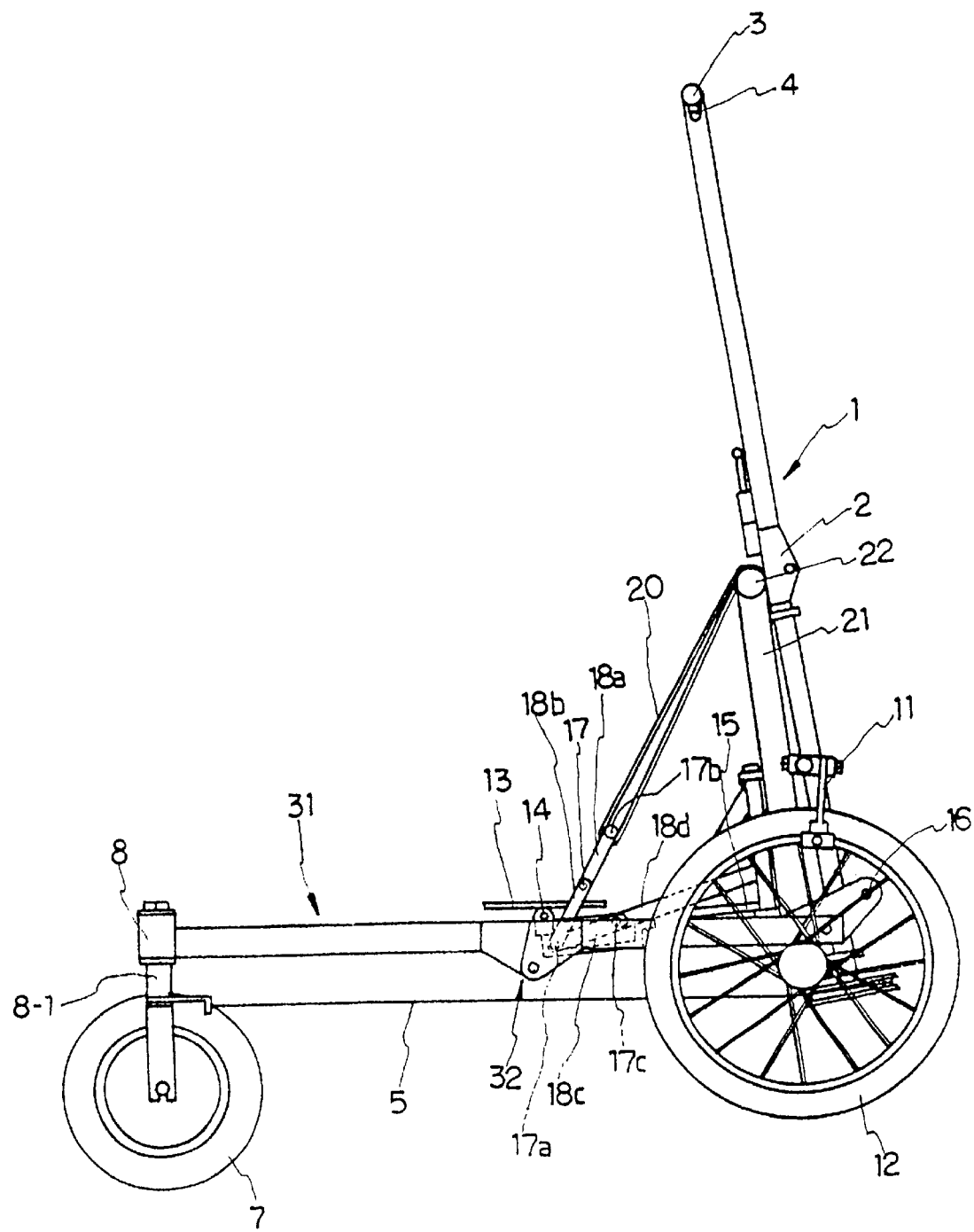
FIG. 4 is a side elevational view of the tricycle with a pedal fully lowered down.
Figure 5:
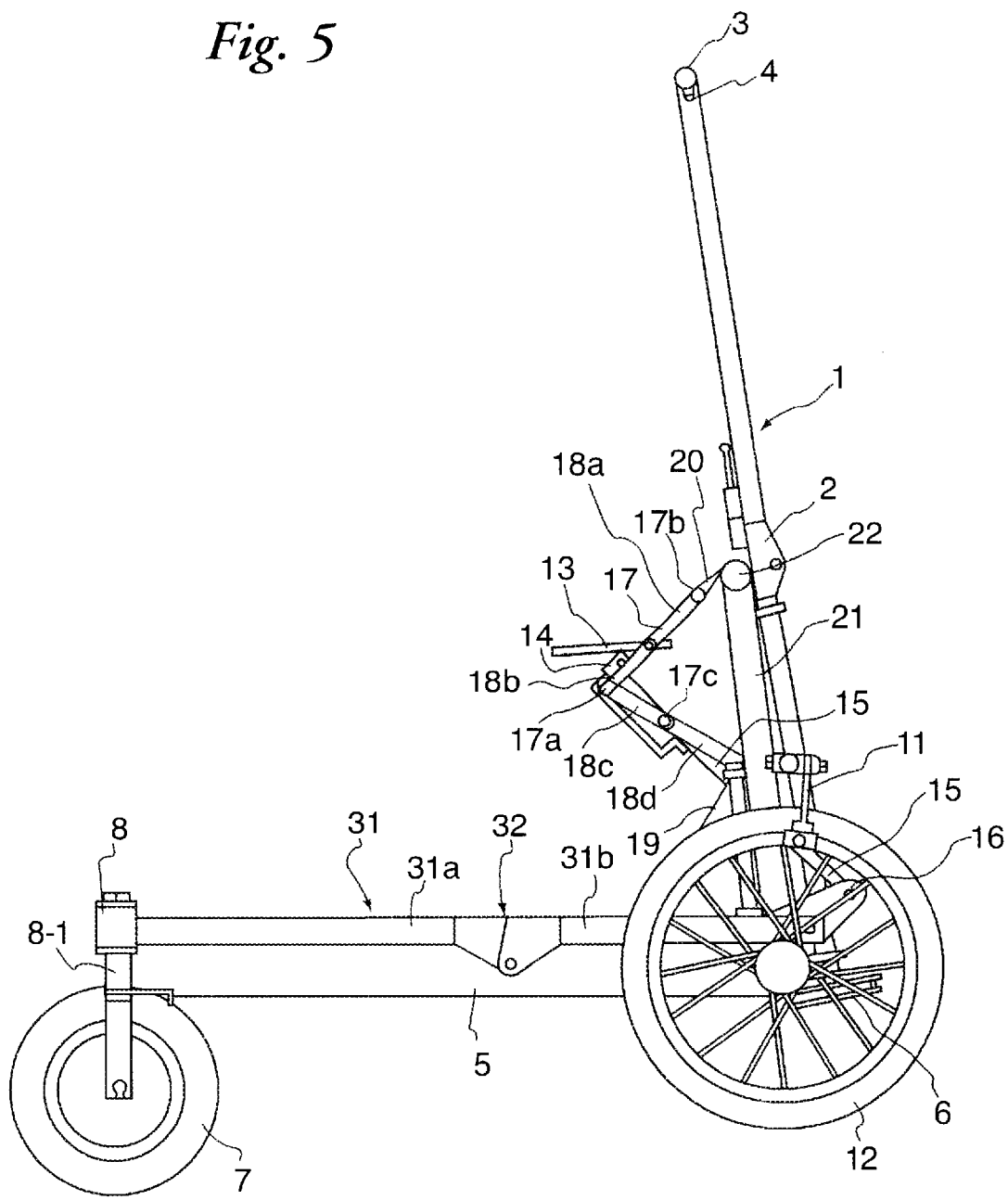
FIG. 5 is a side elevational view of the tricycle with the pedal fully lifted up.
Figure 6:
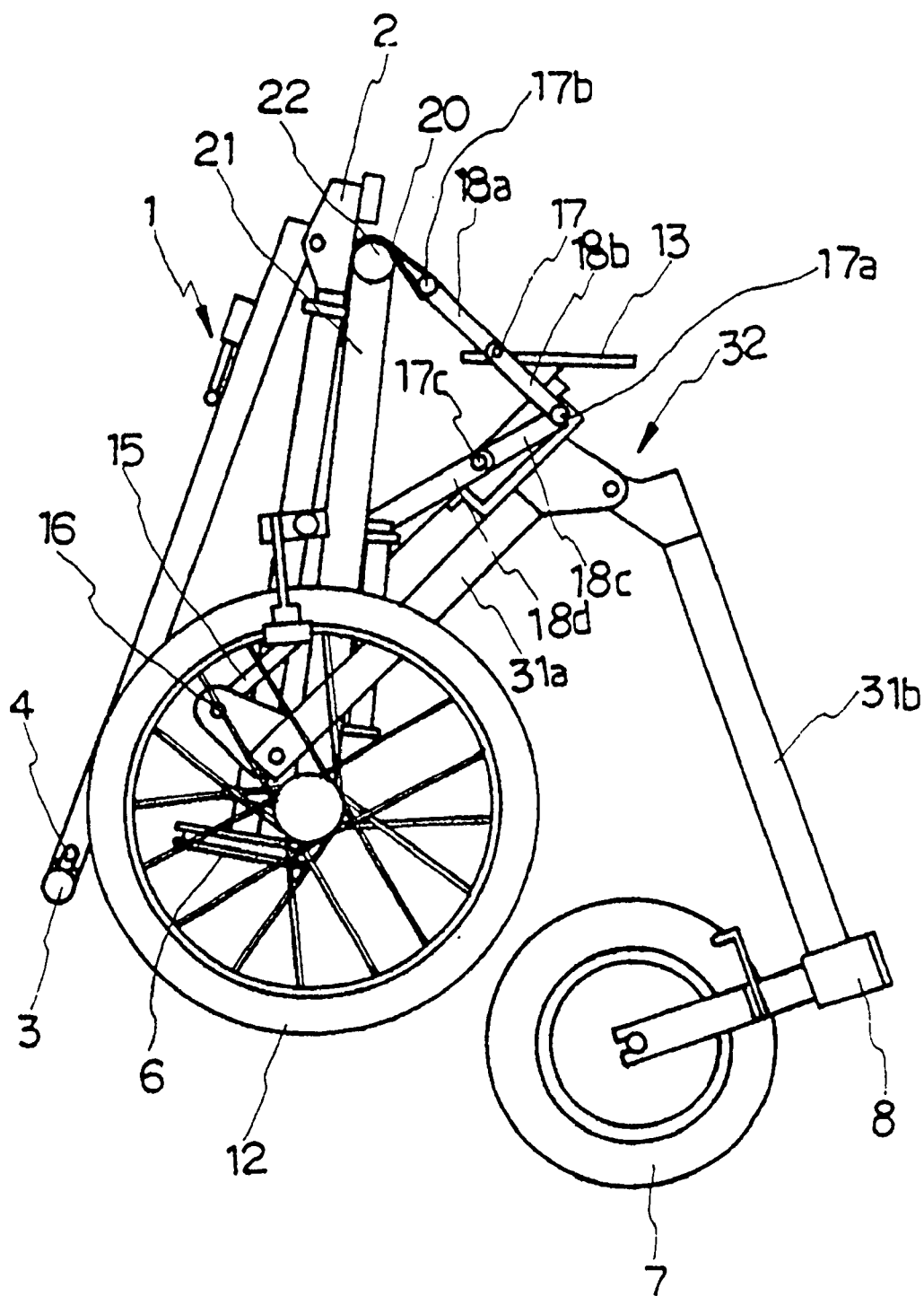
FIG. 6 is a side elevational view, showing the completely folded tricycle of this invention.

In FIG. 1, the reference numeral 31 designating a main frame of the folding tricycle of this invention, which has a first folding part 32 in the middle of it. The main frame part 31 consists of a front main frame part 31a and a rear main frame part 31b with the first folding part 32 joining the front and rear frame parts 31a and 31b together. The front main frame part 31a has a front wheel shaft housing D and two support rods 21 and a roller 22, while the rear main frame part 31b has a rear wheel support assembly 8. Two front wheels 12 are positioned beside the ends of the front wheel shaft housing D respectively, while a rear wheel 7 is mounted to the rear wheel support assembly 8.

The steering unit comprises a steering shaft 1, which is rotatably and vertically mounted to the middle of the front end of the main frame 31 at its lower end. The steering shaft 1 has a second folding part 2 in its middle portion. A steering handle 3 is fixedly and horizontally mounted on the upper end of the steering shaft 1.

Two steering wires 5 extend from a pulley 6 of the steering shaft 1, and intersect each other prior to being coupled to both ends of the rear wheel support assembly 8.

The brake unit has the following construction.

The steering handle 3 is equipped with a brake lever 4, while around a front wheel 12 is mounted a brake band 11. A brake wire 9 extends from the brake band 11 to the steering handle 3.

The drive unit comprises two pedal assemblies, two link assemblies, and a power transmission assembly.

Since the two pedal assemblies have the same construction, only one pedal assembly will be described for ease of description. A support rod 15 is rotatably coupled to one side of the front end of the main frame 31 by means of a pin 16 at its lower end. A pedal 13 is hinged on an upper end of the support rod 15 with a hinge pin 14. And, a guide bracket 15a is mounted on the support rod 15, to form a guide hole H.

Since the two link assemblies have the same construction, only one link assembly will be described for ease of description in the same manner as that of the pedal assemblies. The link assembly comprises a link motion 18 and a spring 19. The link motion 18 consists of multiple links 18a, 18b, 18c and 18d and multiple link pins 17b, 17, 17a and 17c. The first link pin 17b is inserted into the front end of the first link 18a. The second link pin 17 is inserted into an associated pedal 13, the second link pin 17 connecting the first link 18a to the second link 18b. The third link pin 17a is inserted into the guide hole H, the third link pin 17a connecting the second link 18b to third link 18c. The lower end of the forth link 18d is coupled to the lower portion of the support rod 15. The spring 19 is mounted between the link motion 18 and the main frame 31, the spring 19 being fixed at its both ends.

The construction of the power transmission assembly is the following.

Two plate springs 25 are mounted in the middle portion of interior of the front wheel shaft housing D, one plate spring 25 being spaced apart from the other plate spring 25.

Two front wheel shafts 30 pass through two sides of the front wheel shaft housing D respectively, each of the front wheel shafts 30 having a clutch gear 29 at its inner end, on its outer end of the front wheel shafts 30 each of the front wheels 12 is fixedly mounted.

Two cam rollers 23 are positioned between each of the plate springs 25 and each of the clutch gears 29 respectively. The inner shaft 24 of each of the rollers 23 is connected to the inner end of the plate spring 25, while the outer shaft of each of the rollers 23 is supported on the center of the clutch gear 29. Each of the cam rollers 23 has a side structure. The side structure of each roller 23 is specifically designed to selectively push an engaging ring 26 during a forward directional rotating action and to selectively pull the ring 26 during an inverse directional rotating action. Two engaging rings 26 are movably positioned around the outer shafts of the cam rollers 23 respectively, each of the engaging rings 26 having an engaging projection 26a on its inside surface and an engaging tooth 26b on its outside surface.

Two restraining elements 28 are mounted on the outer surface of the front wheel shaft housing D by means of a pin 28a. The inner end of each of the restraining elements 28 is supported by a spring 27, the outer end of each of the restraining elements 28 having a pressing projection 28-1.

Two bands 20 are caught by the first link pins 17b at their one ends respectively, and are fixed to and wound around the cam rollers 23 at their other ends respectively.

The operation of the above-mentioned construction is described hereinafter.

Since the main frame 31 and the steering shaft 1 have the first and second folding parts 32 and 2 respectively, the main frame 31 and the steering shaft 1 may be folded respectively at their folding parts 32 and 2. Therefore, when it is necessary to move and carry the tricycle, the main frame 31 and the steering shaft 1 are completely folded at their folding parts 32 and 2, thereby to be of a small size. This is convenient to a user while moving and carrying the tricycle.

For steering the tricycle, the steering handle 3 has to be turned to a desired direction. When the steering handle 3 is turned, the steering wire 5, concerned with the desired direction, is pulled to the amount proportional to the amount of turning of the steering handle 3. As the steering wire 5 is pulled, a shaft 8-1 of the rear wheel support assembly 8 is rotated to the amount proportional to the amount the steering wire is pulled thereby turning the wheel to the desired direction.

When stopping the tricycle, the brake wire 9 has to be operated. When the brake lever 4 is operated, the brake wire 9 is pulled. As the brake wire 9 is pulled, the brake band 11 tightens around the front wheel 12, thereby stopping the tricycle.

The pedal 13 is partially rotatable around the hinge pin 14 as a fulcrum while the support rod 15 is partially rotatable around the pin 16 as a fulcrum. When the two rotating actions are combined, a rotating force from the pedal 13 causes the support rod 15 to rotate around the pin 16, while keeping their posture horizontal. In addition, it should be noted that the two pedals 13 are pressed down alternately.

Further, since the second link pin 17 and the third link pin 17a are inserted into the pedal 13 and the guide hole H respectively, the second link pin 17 of the link assembly is rotated together with the pedal 13.

When the pedal 13 is pressed, the band 20, caught by the first link pin 17b, is pulled by the first link pin 17b, thereby rotating the cam roller 23. In accordance with a forward directional rotating action of the cam roller 23, the engaging ring 26 is pushed outwards by the side structure of the cam roller 23, thereby allowing the engaging tooth 26b of the engaging ring 26 to engage with the clutch gear 29. During such an operation, the restraint element 28 presses the side surface of the engaging ring 26, so as to restrain the engaging ring 26 from rotating around the outer shaft of cam roller 23. When the tooth 26b of the engaging ring 26 engages with the clutch gear 29, the front wheel shaft 30 having the clutch gear 29 is rotated in the forward direction together with both the cam roller 23 and the engaging ring 26, thereby rotating the front wheel 12 forward. During the above-mentioned rotating action of the cam roller 23, the plate spring 25 is being tightened.

When the pedal 13 is released, the tightened plate spring 25 is loosened. The cam roller 23 is thus rotated in an inverse direction. In accordance with the inverse directional rotating action of the cam roller 23, the engaging ring 26 is pulled inwards by the side structure of the cam roller 23, thereby allowing the tooth 26b of the engaging ring 26 to disengage from the clutch gear 29. During such an operation, the restraint element 28 presses the side surface of the engaging ring 26, to restrain the engaging ring 26 from rotating around the outer shaft of the roller 23. After the tooth 26b of the engaging ring 26 disengages from the clutch gear 29, the front wheel shaft 30 having the clutch gear 29 is still rotated in the forward direction due to both an inertia force acting on the front wheel shaft 30 and the driving force of the other front wheel shaft 30. Further, when the pedal 13 is released from an external force, the spring 19, which has been compressed by the link motion 18, elastically returns the link motion 18 to its original position due to the restoring force of the spring 19, thereby erecting the support rod 15.

In addition, since the pedals 13 are pressed alternatively, the pedaling force is exerted on one of the two front wheel shafts 30. Accordingly, when one of the front wheel shafts 30 acts as a driving shaft, the other of the front wheel shafts 30 becomes a driven shaft.

Industrial Application

According to the foregoing invention, the exercise effect will be maximized since a user has to pedal the tricycle while standing up on the pedals.

This invention also provides a tricycle with the steering unit comprising a steering shaft, a steering handle, and two steering wires, so this invention allows a user to steer the tricycle to a desired direction freely.

And, since this invention includes a brake unit consisting of a brake lever, a brake wire, and a brake band, a user may stop the tricycle freely by operating the brake lever.

Further, this invention also helps a user to move and carry the tricycle easier, by providing a main frame and a steering shaft with folding parts respectively so as to fold the tricycle.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

I claim:

1. A folding tricycle, comprising:
    a running unit, said running unit including a main frame, two front wheels, said two front wheels mounted at a front end portion of said frame, and a rear wheel mounted to a rear end portion of the frame, said main frame consisting of two frame parts with a first folding part joining said two frame parts together, thus being foldable at the said folding part, said two frame parts respectively having a front wheel shaft housing and a rear wheel support assembly;
    a steering unit used for steering said rear wheel, said steering unit having a second folding part, thus said steering unit being foldable at the second folding part;
    a brake unit used for selectively braking the front wheels; and
    a drive unit, said drive unit including two pedals used for generating a rotating force and transmitting the rotating force to said front wheels through said two front wheel shafts alternately acting as driving and driven shafts, said drive unit being designed to generate the rotating force from said pedals operated by a user standing up with both feet being placed on the said two pedals.

2. The folding tricycle according to claim 1, wherein said steering unit consists of:
    a steering shaft rotatably and vertically mounted to said main frame and having said second folding part in its middle portion;
    a steering handle mounted to an upper end of said steering shaft; and
    two steering wires extending from a pulley of said steering shaft and intersecting each other prior to being coupled to both ends of said rear wheel support assembly.

3. The folding tricycle according to claim 1, wherein said brake unit consists of a brake lever and a brake band with a brake wire extending from said brake lever to said brake band.

4. The folding tricycle according to claim 1, wherein said drive unit comprises:
    two pedal assemblies, each of said pedal assemblies including a support rod and one of said two pedals, said support rod being rotatably coupled to each side of the front end portion of said main frame, said pedal being hinged on an upper end of said support rod;
    a link assembly consisting of a link motion and a spring, said link motion being connected to both said pedal and a lower portion of said support rod at both ends thereof, said spring being held between said link motion and said main frame, and
    a power transmission assembly including:
        two plate springs set in the middle portion of said front wheel shaft housing; said plate springs spaced apart from each other;
        the two front wheel shafts individually having a clutch gear at its inner end and projecting from each end of said front wheel shaft housing outwardly at its outer end, with the two front wheels being fixed to the outer ends of said two front wheel shafts;
        a pair of cam rollers; each cam roller positioned between each of said two plate springs and an associated clutch gear, said each roller being connected to an inner end of said plate spring at an its inner shaft and being supported on a center of said associated clutch gear at an outer shaft, said each cam roller also having a side structure designed to selectively push an engaging ring during a forward directional rotating action thereof and to selectively pull said ring during an inverse directional rotating action;
        the engaging ring movably positioned around said outer shaft of the cam roller, and having an engaging projection on its inside surface and an engaging tooth on its outside surface;
        a restraining element mounted on an outer surface of said front wheel shaft housing and adapted for preventing said engaging ring from being rotated when the ring is pushed or pulled; and
        a band caught by an upper end of said link motion at its first end, and fixed to and wound around said cam roller at its second end.

* * * * *